US005161779A

United States Patent [19]

Graner et al.

[11] Patent Number: 5,161,779

[45] Date of Patent: Nov. 10, 1992

[54] MAGNET SYSTEM

[75] Inventors: Juergen Graner, Sershiem; Guenther Bantleon, Salach; Hans Kubach, Hemmingen; Marcel Kirchner, Stuttgart, all of Fed. Rep. of Germany

[73] Assignee: Robert Bosch GmbH, Stuttgart, Fed. Rep. of Germany

[21] Appl. No.: 702,539

[22] Filed: May 20, 1991

[30] Foreign Application Priority Data

Jul. 28, 1990 [DE] Fed. Rep. of Germany ....... 4024054

[51] Int. Cl.[5] .............................................. F16K 31/06

[52] U.S. Cl. ................................ 251/129.16; 251/65; 251/129.15; 251/129.22

[58] Field of Search ................ 251/129.16, 65, 129.22, 251/129.15; 335/229

[56] References Cited

U.S. PATENT DOCUMENTS 4,403,765 9/1983 Fisher .................................. 251/65

4,890,815 1/1990 Hascher-Reichl et al. ...... 251/65 X

*Primary Examiner*—Arnold Rosenthal

*Attorney, Agent, or Firm*—Edwin E. Greigg; Ronald E. Greigg

[57] ABSTRACT

A magnet system for magnet valves for controlling liquids including an electromagnet and a permanent magnet that produces magnetic fluxes, the magnetic fluxes of which are oriented opposite one another in a working air gap formed between a free-floating armature and a magnet pole. To attain a course of the force of attraction acting upon the armature that becomes negative beyond a certain excitation of the electromagnet, and to reduce the trigger power for the electromagnet, a magnetic opposite pole is disposed on the side of the armature remote from the working air gap, forming a second working air gap, which is coupled to the magnet housing, optionally via a stray air gap, via a flow guide element annularly engaging the permanent magnet.

30 Claims, 3 Drawing Sheets

MAGNET SYSTEM

BACKGROUND OF THE INVENTION

The invention is based on a magnet system for magnet valves for controlling liquids, in particular for fuel injection valves, of a vehicle.

German patent publication DE 39 21 151 A1 (U.S. patent application Ser. No. 07/487,576 filed Mar. 2, 1990) discloses such a magnet system for a fuel injection valve (see FIG. 3); this magnet system is sketched in FIG. 1, to explain its basic structure.

The known magnet system in FIG. 1 has an electromagnet 1 with an exciter coil 2 which surrounds a cylindrical magnet core 3 forming a magnet pole with a pole face. Coaxially with the magnet core 3, the exciter coil 2 is surrounded by a magnet housing 4, which is magnetically conductively connected on the one hand, via a short-circuit yoke 5, to the face end of the magnet core 3 remote from the pole face and on the other hand to the pole face of the magnet core 3, via an annular land 6 with a magnetic constriction 7. Coaxially with the magnet core 3, a thin, disk-shaped permanent magnet 8, which is covered by an annular pole plate 9, is seated on the annular land 6. Opposite the magnet pole formed by the magnet core 3 is an armature 10, which extends part way over the pole plate 9 and toward the pole face forms a working air gap 11. The disposition of the permanent magnet 8 and the circulation of the exciter coil 2 are selected such that the magnetic flux of the permanent magnet 8 and the magnetic flux of the electromagnet 1 are opposed to one another in the working air gap 11. The armature 10, firmly connected to the valve member of the magnet valve, is embodied as free-floating. When the electromagnet 1 is unexcited, the armature 10 is kept attracted to the magnet core 3 by the permanent magnet 8, counter to the hydraulic pressure exerted in the valve chamber on the valve member. Upon excitation of the electromagnet 1, the magnetic flux of the permanent magnet 8 in the working air gap 11 is weakened, so that its retention force acting upon the armature 10 decreases to such a point that the armature 10 lifts from the magnet core 3 because of the hydraulic counter force and as a result opens the valve.

The magnetic flux generated by the exciter coil 2 is designated by the symbol $\phi_E$, and that generated by the permanent magnet 8 is represented in FIG. 1 by $\phi_P$. It can be seen clearly that the magnetic flux $\phi_E$ develops, via the armature 10, working air gap 11, magnet core 3, short-circuit yoke 5, magnet housing 4, permanent magnet 8 and pole plate 9, into two magnet circuits that are symmetrical with the axis of the magnet system. Since the permanent magnet 8 has a permeability like that of air, it generates a relatively high magnetic resistance in the magnet circuit of the electromagnet 1, and this has to be compensated for with an increased triggering output of the exciter coil. To reduce the magnetic resistance, the cross-sectional area of the permanent magnet 8 is therefore made relatively large, while the slight thickness that as a result is possible for the permanent magnet 8 results from the necessary magnetic voltage and the coercive field intensity, which is as large as possible. Because of its larger area, the eddy current losses in the permanent magnet 8 are larger as well. Thus, large permanent magnets 8 are subject to considerable danger of breakage when they are machined, which considerably increases their manufacturing costs. To reduce the eddy current losses, the permanent magnet 8 is manufactured from cobalt-samarium, which is of relatively low resistance but on the other hand is quite brittle, so that the danger of breakage in magnet machining is increased still further. As already mentioned, the free-floating armature 10 is raised from the magnet pole exclusively by the hydraulic counterpressure exerted on the valve member of the magnet valve. The hydraulic counterpressure decreases sharply during the opening phase of the magnet valve and sometimes even becomes negative. A magnetic force of reversing polarity would therefore be desirable to reliably keep the valve open. Even upon reversal of the magnetic flux in the armature 10, this is impossible, however, since the magnetic force is proportional to $(\phi_P-\phi_E)^2$, or in other words is proportional to the square of the difference in magnetic flux.

OBJECT AND SUMMARY OF THE INVENTION

The magnet system according to the invention has an advantage that the magnet circuit of the electromagnet now closes via the opposite pole, the second working air gap, the armature, the first working air gap, the magnet core, the short-circuit yoke and the magnet housing, and thus the permanent magnet, with its high magnetic resistance, is no longer located in the magnetic circuit of the electromagnet. As a result, on the one hand the triggering power for the electromagnet becomes less, in particular if the armature has dropped off the permanent magnet, and on the other hand greater freedom in dimensioning the permanent magnet and selecting the material for making it is obtained. The permanent magnet no longer needs to be dimensioned from the standpoint of minimized magnetic resistance. Thus, the permanent magnet can be made thicker, increasing its resistance to breakage. As the magnetic material, instead of the cobalt-samarium used previously because of its low remanence temperature coefficient, iron-neodymium can now be used as well, which has approximately twice the resistance at comparable magnetic energy, and because of its high remanence temperature coefficient was previously not even considered. Iron-neodymium is not as brittle as cobalt-samarium and can be worked better. Overall, in the magnet system of the invention, the permanent magnet can be manufactured at substantially more favorable cost.

In the structural embodiment of the magnet system of the invention with a opposite pole and a second working air gap, a lifting force is exerted upon the armature upon excitation of the electromagnet that is oriented counter to the attraction force of the permanent magnet. As FIG. 3 shows, the force of attraction of the permanent magnet and electromagnet acting upon the armature (given a constant working air gap) decreases with increasing excitation of the electromagnet and finally becomes negative, so that the armature is removed from the magnet pole not only by the hydraulic pressure in the magnet valve but additionally by an electromagnetically generated lifting force. This negative magnet force is desirable when the magnet system is used in hydraulic valves, in particular fuel injection valves, since in these valves the hydraulic pressure acting upon the armature via the valve member becomes quite low during the opening stroke of the magnet system and is no longer sufficient to keep the armature in a defined terminal position, in which the magnet valve is definitively open. This "negative attraction force" upon the armature is generated without current reversal in the exciter coil of the electromagnet, so that it is unnecessary to intervene into the electronic control system. When the magnet excitation is shut off, a maximum attraction force $F_{max}$ acts upon the armature. By means of the magnetic voltage at the stray air gap between the magnet housing and the opposite pole, the operating range can be shifted in parallel between $F_{max-an}$ and $F_{min-an}$ (an stands for attracted) via the circulation $I \times w$, in accordance with the dot-dash line in FIG. 3. The dotted characteristic curve for the dropping armature shown in FIG. 3 can also be shifted along the circulation. The reversing points $w \times I_{an}$, $w \times I_{ab}$, at which the attraction force F is equal to the hydraulic force $F_{Hydr.}$ acting on the armature (assuming use of the magnet system in a hydraulic magnet valve) are thus adjustable. Without magnetic voltage in the stray air gap, they would be located outside the desired range.

The hysteresis $I_{an}-I_{ab}$ of the electric excitation of the electromagnet, that is, the excitation of the electromagnet necessary to move the armature out of the two stop positions, is less than the known magnet system by the factor of the square root of 2, with otherwise identical data. Thus, the power requirement needed to trigger hysteresis is less by one half. This makes it possible either to reduce the current and thus the eddy current losses, or to reduce the number of windings of the exciter coil and thus to lessen its inductivity.

The magnet system according to the invention is also distinguished by an adequately high speed for variation in the magnetic force acting upon the armature via the exciter current. The influence of variable forces $F_{Hydr.}$ at the armature stops on the switching time is reduced as well.

Advantageous further features of and improvements to the circuit arrangement are attainable with the characteristics recited herein.

In one advantageous embodiment of the invention, the face end of the magnet housing remote from the short-circuit yoke is connected to the magnet core, near its pole face, via an annular land that is preferably integral with the magnet housing. The permanent magnet rests on the annular land and is held on it solely by its magnetic force. A magnetic constriction acting in the radial direction is incorporated in the annular lands. By suitably embodying this constriction, the modulation of the magnetic flux in the magnet core can be adjusted optimally. By purposeful saturation of the magnetic constriction, stray flux from the electromagnet can also be prevented from flowing across the constriction.

In a preferred embodiment of the invention, the opposite pole and flow conducting element is achieved by means of a pole plate secured by a holder to the magnet housing. The holder comprises nonmagnetic or soft magnetic material, such as nickel-iron, having a Curie temperature of approximately 80° C. The soft magnetic material is used whenever the permanent magnet is made of iron-neodymium in order to compensate exactly for the high temperature drift of the iron-neodymium permanent magnet by means of the wide temperature drift of the low saturation induction of the nickel-iron.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 2:
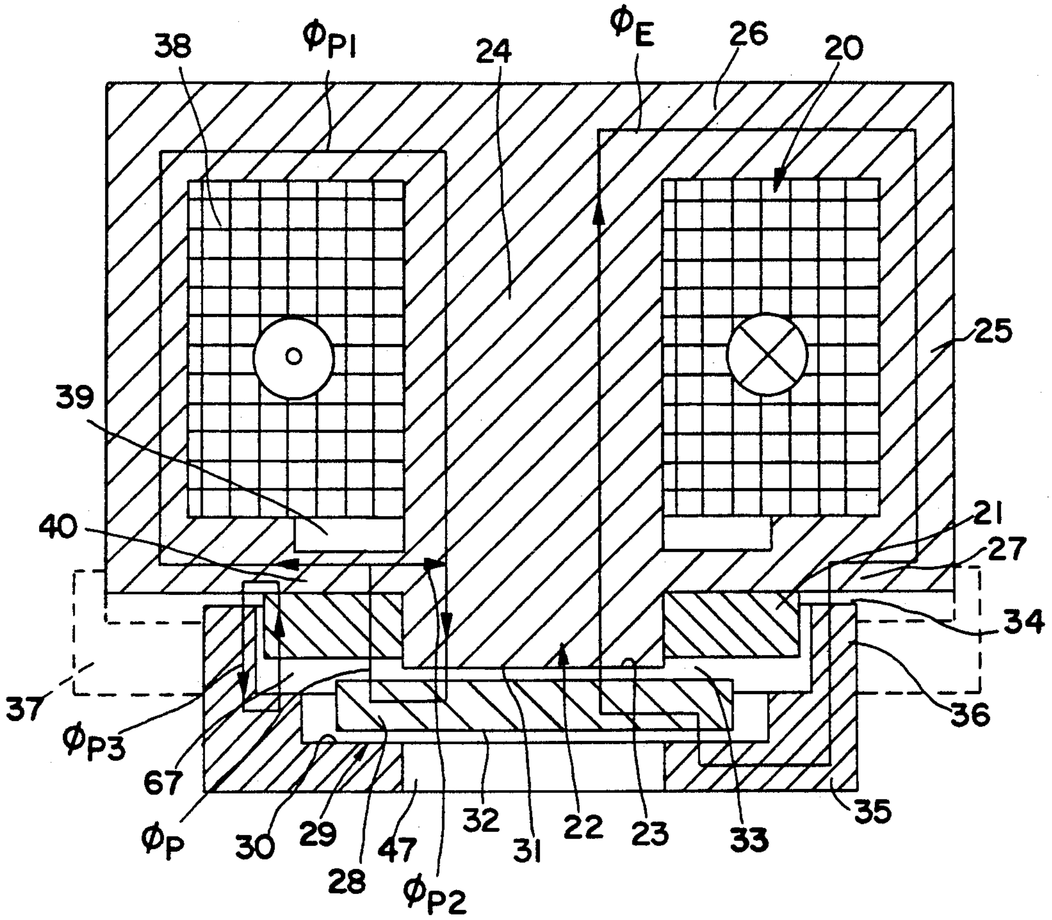
FIG. 2 is a schematic longitudinal section through the magnet system according to the invention.

FIG. 2 schematically shows a longitudinal section through a magnet system for magnet valves for controlling liquids, which illustrates the basic structure of the magnet system. The magnet system comprises an electromagnet 20 and a permanent magnet 21. The electromagnet 20 in a known manner has an exciter coil 38, which annularly surrounds a magnet core 24 forming a magnet pole 22 with a pole face 23 and is in turn surrounded by a magnet housing 25. The magnet housing is connected on one end via a short-circuit yoke 26 to the face end of the magnet core 24 remote from the pole face 23 and on the other end, via an annular land 27 near the pole face 23, to the magnet core 24. The magnet core 24, magnet housing 25, short-circuit yoke 26 and annular land 27 consist of the same ferromagnetic material. The annular permanent magnet 21 rests on the annular land 27 and encloses the magnet core 24. It is held on the annular land 27 solely by its magnetic force and covers only a portion of the surface of the annular land 27. The permanent magnet may be made from iron-neodymium.

A disk-shaped armature 28 is located free-floatingly facing the magnet pole 22, forming a first working air gap 31, and it overlaps a portion of the permanent magnet 21, forming a larger annular air gap 33. On the side of the armature 28 remote from the working air gap 31 there is a magnetic opposite pole 29, the pole face 30 of which forms a second working air gap 32 with the armature 28. The opposite pole 29 with its annular pole face 30 is embodied on a pole plate 35, which is spaced circumferentially from the permanent magnet 21 with a peripheral land 36 and is coupled to the annular land 27 and thus to the magnet housing 25 via an annular stray gap 34. The pole plate 35 is secured to the magnet housing 25 with a holder 37 and has a circular recess for the passage therethrough of a valve member to be connected to the armature 28. The holder 37 is either of non-magnetic material or of soft magnetic material with a Curie temperature of approximately 80° C. An example of such a soft magnetic material is nickel-iron. This material is preferably used whenever the permanent magnet 21 is made from iron-neodymium. With the wide temperature drift of the low saturation induction of the nickel-iron, the high-temperature drift of the permanent magnet 21 of iron-neodymium can be compensated for exactly. The circulation, characterized by the symbols entered, of the exciter coil 38 of the electromagnet 20 and the disposition of the permanent magnet 21, which is axially magnetized, are selected such that the magnet fluxes $\phi_E$ and $\phi_P$ of the electromagnet 20 and permanent magnet 21 are in opposite directions to on another in the working air gap 31. These two magnet fluxes develop symmetrically with the axis of the magnet system. For the sake of simplicity, the particular magnet flux is shown in FIG. 2 only in one symmetrical half. The magnet flux $\phi_P$ of the permanent magnet 21 is divided into two partial fluxes $\phi_{P1}$ and $\phi_{P2}$. A stray flux $\phi_{P3}$ develops across the stray air gap 34. $\phi_{P2}$, in the region 67 of the permanent magnet 21 protruding over the armature 28, does not extend past the armature 28 and serves to magnetically bias the stray air gap 34.

In the annular land 27, a magnetic constriction 40 is formed by the provision of an annular groove 39. This constriction 40 reduces the partial flux $\phi_{P2}$ to a value that is optimal for controlling the flux in the magnet core 24 in both directions. The constriction 40 can also be purposefully saturated, to prevent a stray flux of $\phi_E$ from flowing over this path. The motion of the armature 28 is limited by stops, not shown here, so that a residual air gap remains between each of the pole faces 23 and 30 and the armature resting on the stop. The annular air gap 33 is approximately twice as large as the maximum working air gap 31 or the maximum working air gap 32, which is equivalent to the maximum stroke of the armature 28. The annular cross-sectional area of the permanent magnet 21 is made approximately 1.5 times larger than the sum of the pole faces 23, 30 of the magnet pole 22 and the opposite pole 29.

Figure 3:
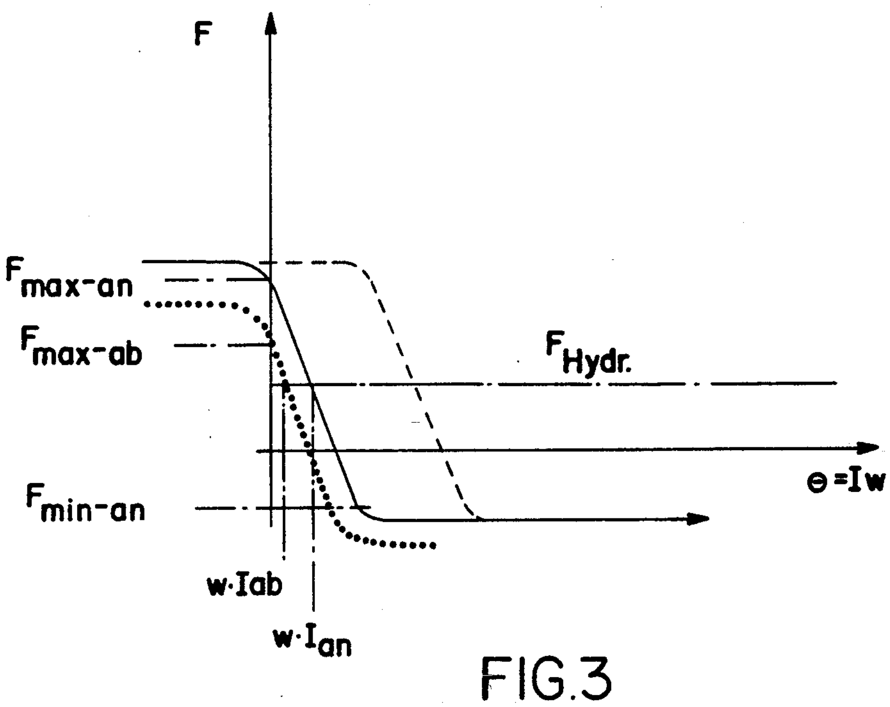
FIG. 3 shows diagrams of the magnetic force of the magnet system of FIG. 2 over the current in the exciter coil.

The force F that acts upward on the armature 28, in other words toward the magnet pole 22, is shown in FIG. 3 as a function of the circulation & for the two stop positions of the armature (an=abbreviation for "attracted"; ab=abbreviation for "dropped-off"). If the circulation & of the exciter coil 38 is zero, then the armature 28 is acted upon with maximum forces $F_{max-an}$, $F_{max-ab}$, which are generated solely by the permanent magnet 21. With increasing ampere windings & of the exciter coil 38 or by varying the stray air gap 38, the magnetic flux of the permanent magnet 21 in the working air gap 31 is weakened. At the same time, in the working air gap 32, a contrary force acting upon the armature 28 in the opposite direction is generated. The force acting upward on the armature 28 decreases, as shown in FIG. 3, and finally becomes negative.

Figure 1:
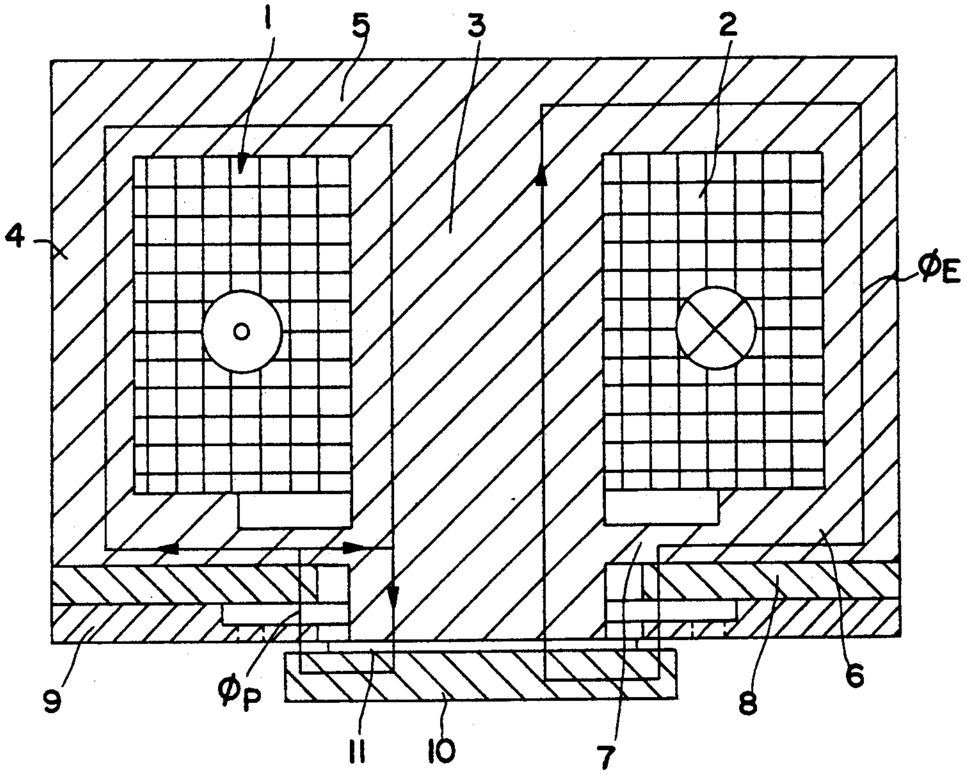
FIG. 1 PRIOR ART
FIG. 1 is a schematic longitudinal section through a magnet system in accordance with the prior art.
Figure 5:
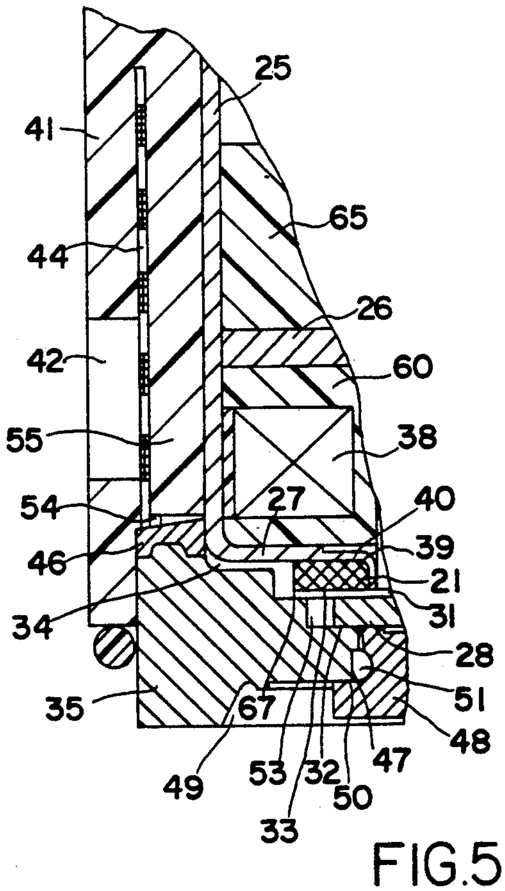
FIG. 5 is a detail view of a portion of the fuel injection valve of FIG. 4.
Figure 4:
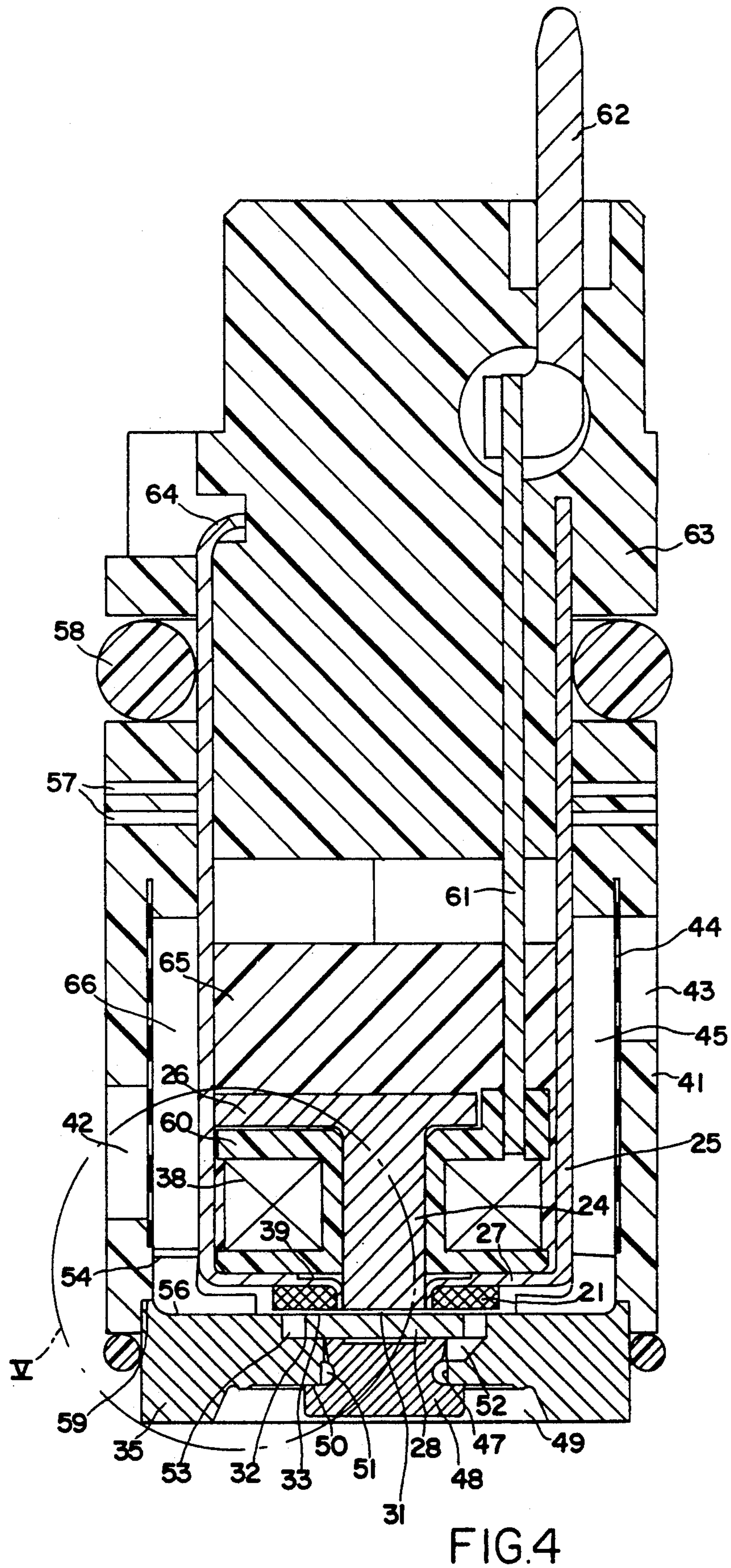
FIG. 4 is a longitudinal section through a fuel injection valve with an integrated magnet system of FIG. 2.

FIG. 4 shows a longitudinal section of a fuel injection valve in which the magnet system described is used. To the extent that components match those of FIG. 2, they are identified by the same reference numeral. The magnet system is used in a filter housing 41, in which a fuel inlet 42 and a fuel outlet 43 are provided. The fuel inlet 42 and fuel outlet 43 are separated by an injection-inserted filter or screen 44 from axial conduits 45, 66 that extend as far as the pole plate 35 of the magnet system. A plurality of fuel guide elements 55 (FIG. 5) are inserted between the axial conduits 45, 66. The pole plate 35 closes off the filter housing 41 at the face end and is welded to the magnet housing 25 by connection elements 46 that corresponding to the holder 37 of FIG. 2 and ar either nonmagnetic or are magnetically saturated as a function of temperature. A valve body 48 that is firmly joined to the armature 28 extends through the circular recess 47 of the pole plate 35. Concentric with the recess 47, the pole plate 35 has a recess 49 on the side remote from the armature 28, and a valve seat 50 is formed at this recess; the valve body 48 cooperates with this valve seat to close and open the fuel injection valve. Above the valve seat 50, the valve body 48 has an encompassing groove 51, which communicates, via radial slits 52 disposed in the pole plate 35 in the region of the through opening 47, with a flow gap 53 annularly surrounding the armature 28; this gap communicates in turn with the axial conduits 66, via conduits 56. The flow of fuel in conduits 54 between the axial conduits 45 and 66 should preferably cool the pole plate 35. The flow of fuel in the flow gap 53 cools the forward region of the valve. In hot starting, the liquid portion of the fuel can collect below the conduits 54 in the chamber 56 (FIG. 4) and be separated from the gaseous components so that only liquid fuel is injected.

The regions 57 of the filter housing 41 are resiliently embodied, so that regardless of the size of an O-ring 58 the filter housing 41 presses against a stop 59 on the pole plate 35. The exciter winding 38 of the electromagnet 20 is supported by a coil body 60 and is connected to electrical connection pins 61. These pins are in turn welded to plug prongs 62 in a plug housing 63. The plug housing 63 is firmly joined to the magnet housing 25 by a crimped flange 64. The magnet core 24 with the short-circuit yoke 26 integrally secured to it and the exciter coil 38 are sealed in the magnet housing 25 with a casting compound 65.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A magnet system for magnet valves for controlling liquids, in particular for fuel injection valves, having an electromagnet, which has a magnet core forming a magnet pole, an exciter coil surrounding the magnet core and a magnet housing coaxial with and surrounding the exciter coil, said housing forms a magnetic short circuit and is connected via a short-circuit yoke to a face end of the magnet core remote from a pole face, an annular permanent magnet with an axial direction of magnetization, the permanent magnet being disposed coaxially with the magnet core near its pole face, and having an approximately disk-shaped armature, which is located free-floatingly opposite the magnet pole, forming a working air gap with the pole face thereof, wherein a circulation of the exciter coil and the disposition of the permanent magnet are selected such that the magnetic fluxes of the electromagnet and permanent magnet are in opposite directions to one another in the working air gap, a magnetic opposite pole (29) disposed on a side of the armature (28) remote from the working air gap (31), said magnetic opposite pole (29) forms a second working air gap (32) between its pole face (30) and the armature (28), said magnetic opposite pole is coupled to the magnet housing (25) via a magnetic flux guiding pole plate (35) which is spaced circumferentially from the permanent magnet (21).

2. A magnet system as defined by claim 1, in which the coupling of the magnetic opposite pole (29) to the magnet housing (25) by the pole plate (35) is performed via a stray air gap (34).

3. A magnet system as defined by claim 1, in which the end face of the magnet housing (25) remote from the short-circuit yoke (26) is connected to the magnet core (24), near its pole face (23), via a preferably integral annular land (27); that the permanent magnet (21) rests on the annular land (27); and that the annular land (27) has a magnetic constriction (40) acting in the radial direction.

4. A magnet system as defined by claim 2, in which the end face of the magnet housing (25) remote from the short-circuit yoke (26) is connected to the magnet core (24), near its pole face (23), via a preferably integral annular land (27); that the permanent magnet (21) rests on the annular land (27); and that the annular land (27) has a magnetic constriction (40) acting in the radial direction.

5. A magnet system as defined by claim 3, in which the magnetic constriction (40) is embodied such that it is magnetically saturated, or attains this saturation state very quickly upon application of an electric exciter current to the exciter coil (38).

6. A magnet system as defined by claim 4, in which the magnetic constriction (40) is embodied such that it is magnetically saturated, or attains this saturation state very quickly upon application of an electric exciter current to the exciter coil (38).

7. A magnet system as defined by claim 3, in which the magnet constriction (40) is achieved by means of an annular groove (39) provided in the annular land (27).

8. A magnet system as defined by claim 4, in which the magnet constriction (40) is achieved by means of an annular groove (39) provided in the annular land (27).

9. A magnet system as defined by claim 5, in which the magnet constriction (40) is achieved by means of an annular groove (39) provided in the annular land (27).

10. A magnet system as defined by claim 6, in which the magnet constriction (40) is achieved by means of an annular groove (39) provided in the annular land (27).

11. A magnet system as defined by claim 3, in which the magnetic opposite pole (29) with the pole plate is embodied as an integral pole plate (35), which annularly surrounds the permanent magnet (21) with radial spacing and is magnetically coupled to the annular land (27) and/or magnet housing (25).

12. A magnet system as defined by claim 5, in which the magnetic opposite pole (29) with the pole plate is embodied as an integral pole plate (35), which annularly surrounds the permanent magnet (21) with radial spacing and is magnetically coupled to the annular land (27) and/or magnet housing (25).

13. A magnet system as defined by claim 7, in which the magnetic opposite pole (29) with the pole plate is embodied as an integral pole plate (35), which annularly surrounds the permanent magnet (21) with radial spacing and is magnetically coupled to the annular land (27) and/or magnet housing (25).

14. A magnet system as defined by claim 11, in which between the pole plate (35) and the annular land (27) or magnet housing (25), a stray air gap (34) is formed, which is magnetically biased by means of a magnetic flux which is tapped at the permanent magnet (21), in its region (67) protruding beyond the armature (28).

15. A magnet system as defined by claim 12, in which between the pole plate (35) and the annular land (27) or magnet housing (25), a stray air gap (34) is formed, which is magnetically biased by means of a magnetic flux which is tapped at the permanent magnet (21), in its region (67) protruding beyond the armature (28).

16. A magnet system as defined by claim 13, in which between the pole plate (35) and the annular land (27) or magnet housing (25), a stray air gap (34) is formed, which is magnetically biased by means of a magnetic flux which is tapped at the permanent magnet (21), in its region (67) protruding beyond the armature (28).

17. A magnet system as defined by claim 11, in which the pole plate (35) has a concentric through opening (47) for a valve member (48) for the magnet valve, which member is firmly joined to the armature (28).

18. A magnet system as defined by claim 14, in which the pole plate (35) has a concentric through opening (47) for a valve member (48) for the magnet valve, which member is firmly joined to the armature (28).

19. A magnet system as defined by claim 11, in which the pole plate (35) is secured to the magnet housing (25) via a holder (37), and that the holder (37) is of nonmagnetic material or of soft magnetic material having a Curie temperature of 80° C., such as iron-nickel.

20. A magnet system as defined by claim 14, in which the pole plate (35) is secured to the magnet housing (25) via a holder (37), and that the holder (37) is of nonmagnetic material or of soft magnetic material having a Curie temperature of 80° C., such as iron-nickel.

21. A magnet system as defined by claim 17, in which the pole plate (35) is secured to the magnet housing (25) via a holder (37), and that the holder (37) is of nonmagnetic material or of soft magnetic material having a Curie temperature of 80° C., such as iron-nickel.

22. A magnet system as defined by claim 1, in which the annular cross-sectional area of the permanent magnet located parallel to the pole face (23) of the magnet pole (22) facing the armature (28) is approximately 1.5 times larger than the sum of the pole faces (23, 30) of the magnet pole (22) and the opposite pole (29).

23. A magnet system as defined by claim 2, in which the annular cross-sectional area of the permanent magnet located parallel to the pole face (23) of the magnet pole (22) facing the armature (28) is approximately 1.5 times larger than the sum of the pole faces (23, 30) of the magnet pole (22) and the opposite pole (29).

24. A magnet system as defined by claim 3, in which the annular cross-sectional area of the permanent magnet located parallel to the pole face (23) of the magnet pole (22) facing the armature (28) is approximately 1.5 times larger than the sum of the pole faces (23, 30) of the magnet pole (22) and the opposite pole (29).

25. A magnet system as defined by claim 1, in which the permanent magnet (21) is made from iron-neodymium.

26. A magnet system as defined by claim 2, in which the permanent magnet (21) is made from iron-neodymium.

27. A magnet system as defined by claim 3, in which the permanent magnet (21) is made from iron-neodymium.

28. A magnet system as defined by claim 1, in which the armature (28) at least partially overlaps the permanent magnet (21), forming an annular gap (33), and the permanent magnet (21) is set back far enough with respect to the pole face (23) of the magnet pole (22) that with a minimum working air gap (31) between the armature (28) and the pole face (23) of the magnet pole (22), the annular air gap (33) between the armature (28) and the permanent magnet (21) is equivalent to the maximum stroke of the armature (28).

29. A magnet system as defined by claim 2, in which the armature (28) at least partially fits over the permanent magnet (21), forming an annular gap (33), and the permanent magnet (21) is set back far enough with respect to the pole face (23) of the magnet pole (22) that with a minimum working air gap (31) between the armature (28) and the pole face (23) of the magnet pole (22), the annular air gap (33) between the armature (28) and the permanent magnet (21) is equivalent to the maximum stroke of the armature (28).

30. A magnet system as defined by claim 3, in which the armature (28) at least partially overlaps the permanent magnet (21), forming an annular gap (33), and the permanent magnet (21) is set back far enough with respect to the pole face (23) of the magnet pole (22) that with a minimum working air gap (31) between the armature (28) and the pole face (23) of the magnet pole (22), the annular air gap (33) between the armature (28) and the permanent magnet (21) is equivalent to the maximum stroke of the armature (28).

* * * * *